United States Patent [19]
Driscoll et al.

[11] Patent Number: 5,964,143
[45] Date of Patent: Oct. 12, 1999

[54] BREWING APPLIANCE HAVING A TOWER WITH A WATER RESERVOIR AND BREWING BASKET AND AN ADJACENTLY POSITIONED PITCHER RECEPTACLE

[75] Inventors: Mark Driscoll, Cleveland; Marc L. Vitantonio, S. Russell; John Sovis, Twinsburg, all of Ohio

[73] Assignee: Signature Brands, Inc., Glenwillow, Ohio

[21] Appl. No.: 09/054,846

[22] Filed: Apr. 3, 1998

[51] Int. Cl.⁶ .................................................... A47J 31/00
[52] U.S. Cl. ................................ 99/299; 99/307; 99/313
[58] Field of Search ........................... 99/307, 313, 304, 99/295, 299, 279, 300, 316

[56] References Cited

U.S. PATENT DOCUMENTS

| | | | |
|---|---|---|---|
| 3,958,502 | 5/1976 | Vitous | 99/300 |
| 4,467,707 | 8/1984 | Amiot | 99/279 |
| 4,667,587 | 5/1987 | Wunder | 99/295 |
| 4,676,148 | 6/1987 | Foley | 99/279 |
| 4,825,759 | 5/1989 | Grome et al. | 99/307 |
| 4,893,552 | 1/1990 | Wunder et al. | 99/299 |
| 5,063,836 | 11/1991 | Matuschek | 99/307 |
| 5,219,394 | 6/1993 | Simmons | 99/307 X |
| 5,231,918 | 8/1993 | Grzywna | 99/307 X |
| 5,251,541 | 10/1993 | Anson et al. | 99/280 |
| 5,687,637 | 11/1997 | Brookshire et al. | 99/295 |
| 5,711,207 | 1/1998 | Wu | 99/307 |

*Primary Examiner*—Reginald L. Alexander
*Attorney, Agent, or Firm*—Kramer Levin Naftalis & Frankel LLP

[57] ABSTRACT

A beverage making appliance has a water reservoir, brewing basket and water heating and pumping device within a tower structure with the brewing basket in a top region of the tower. The brewing basket has a sloped floor and a drain hole positioned near an edge of the sloped floor, and positioned over a recess in the tower so that liquid drains from the brewing basket to the exterior of the tower. The recess in the tower is configured to receive a pitcher whereby a pitcher positioned within the recess receives liquid, in the form of a brewed beverage, from the brewing basket. A valve assembly in connection with the drain hole of the brewing basket is controllable from the exterior of the tower to regulate the flow rate of liquid from the brewing basket into the pitcher, thus altering the characteristics of the brewed beverage produced by the appliance.

13 Claims, 11 Drawing Sheets

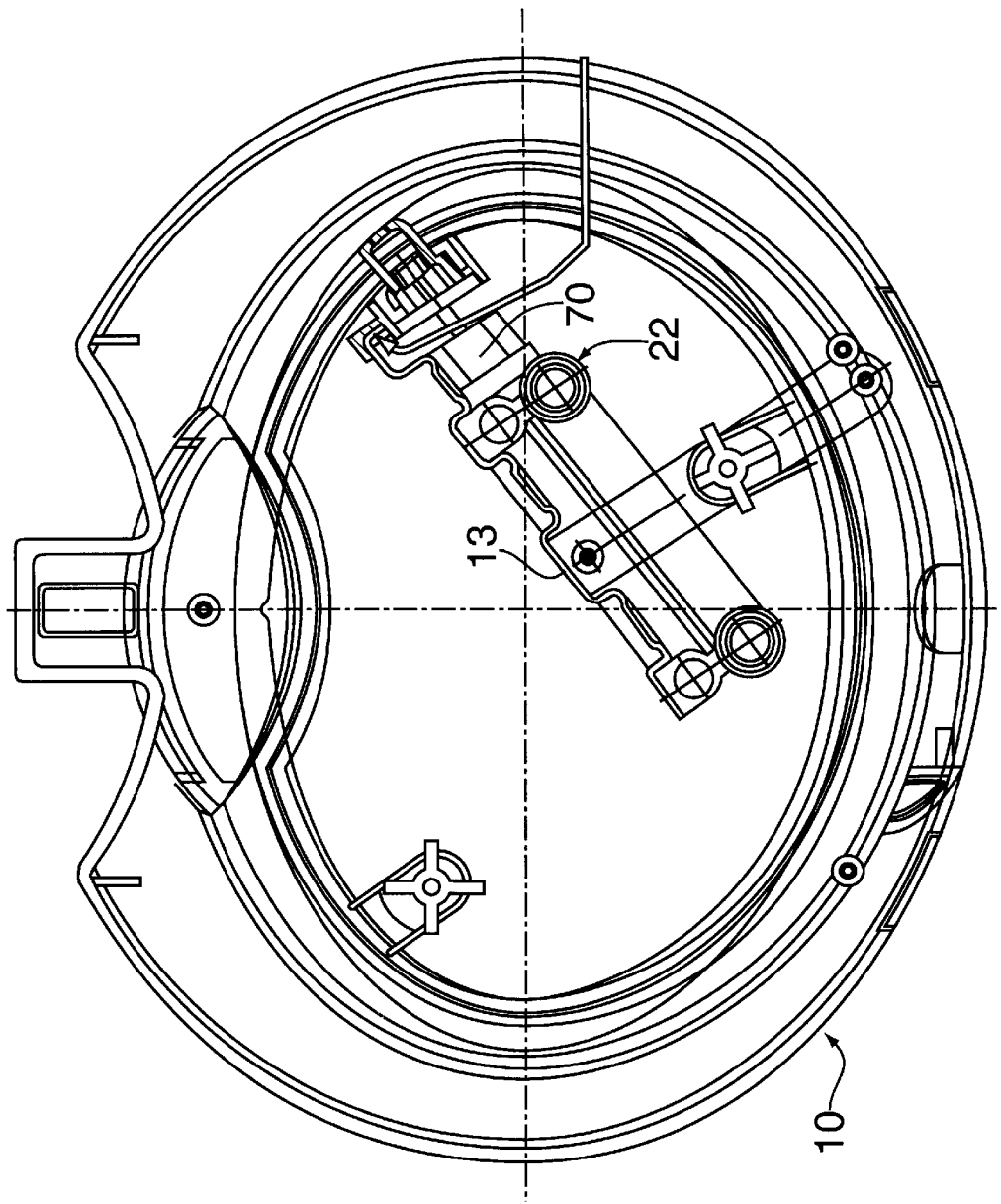

5,964,143

BREWING APPLIANCE HAVING A TOWER WITH A WATER RESERVOIR AND BREWING BASKET AND AN ADJACENTLY POSITIONED PITCHER RECEPTACLE

FIELD OF THE INVENTION

The present invention pertains generally to appliances for preparing brewed beverages such as coffee or tea, and more particularly to automated brewing appliances which have a brewing water reservoir, a heat source for heating water received from the water reservoir, a brewing chamber for holding a brewing material such as coffee or tea, and a receptacle such as a pitcher or carafe.

BACKGROUND OF THE INVENTION

Many different types of automated brewing appliances have been developed to rapidly produce hot brewed beverages. One of the most common arrangements is to provide a water reservoir which drains into a heated conduit. As water within the conduit is heated, it expands and is forced from the heated conduit into a brewing chamber where it is distributed over coffee grounds or tea leaves. The resulting brewed beverage then drains directly from the brewing chamber into a pitcher or carafe which is placed underneath the brewing chamber. Another common arrangement is to position the heated conduit underneath a platform on which the pitcher is held in order to transfer some heat to the pitcher and the beverage contents.

Some disadvantages with this type of design are that the brewing chamber must be made to extend out over the pitcher platform. When the pitcher is removed from the heated platform, excess liquid in the brewing chamber may drip directly onto the platform. Also, the brewing chamber and the pitcher platform generally extend out in front of the appliance, requiring the water reservoir to be at the back and therefore somewhat difficult to access and fill. Also, the pitcher or carafe must be made of a heat resistant material such as glass or metal, and is therefore not typically insulated with less heat resistant materials such as plastic and foam.

SUMMARY OF THE INVENTION

The present invention provides a novel brewing appliance wherein the pitcher is positioned adjacent to a water reservoir and brewing basket tower. In accordance with one aspect of the invention, a brewing appliance includes a tower including a water reservoir, a brewing basket, and a heated conduit connected to the water reservoir and connected to the brewing basket, the brewing basket having a sloped floor and a drain hole at an edge of the sloped floor, a flow rate control valve assembly associated with the brewing basket drain hole, and a pitcher positionable adjacent to the tower so that a brewed beverage drains from the brewing basket through the drain hole into the pitcher.

In accordance with another aspect of the invention, a beverage preparation device has a water reservoir for holding a quantity of water for producing a beverage, a brewing basket for holding a brewing material, the brewing basket having a wall and a sloped floor and a drain in the sloped floor near the wall, the drain hole being positioned to allow passage of liquid to the exterior of the beverage preparation device, and means for heating water connected to the water reservoir and connected to a shower nozzle positioned to distribute heated water into the brewing basket.

These and other aspects of the present invention are herein described in particularized detail with reference to the accompanying Figures.

BRIEF DESCRIPTION OF THE FIGURES

In the accompanying Figures:

FIG. 1A is a top view of the interior of the base of the brewing appliance of the present invention;

DETAILED DESCRIPTION OF PREFERRED AND ALTERNATE EMBODIMENTS

Figure 1:
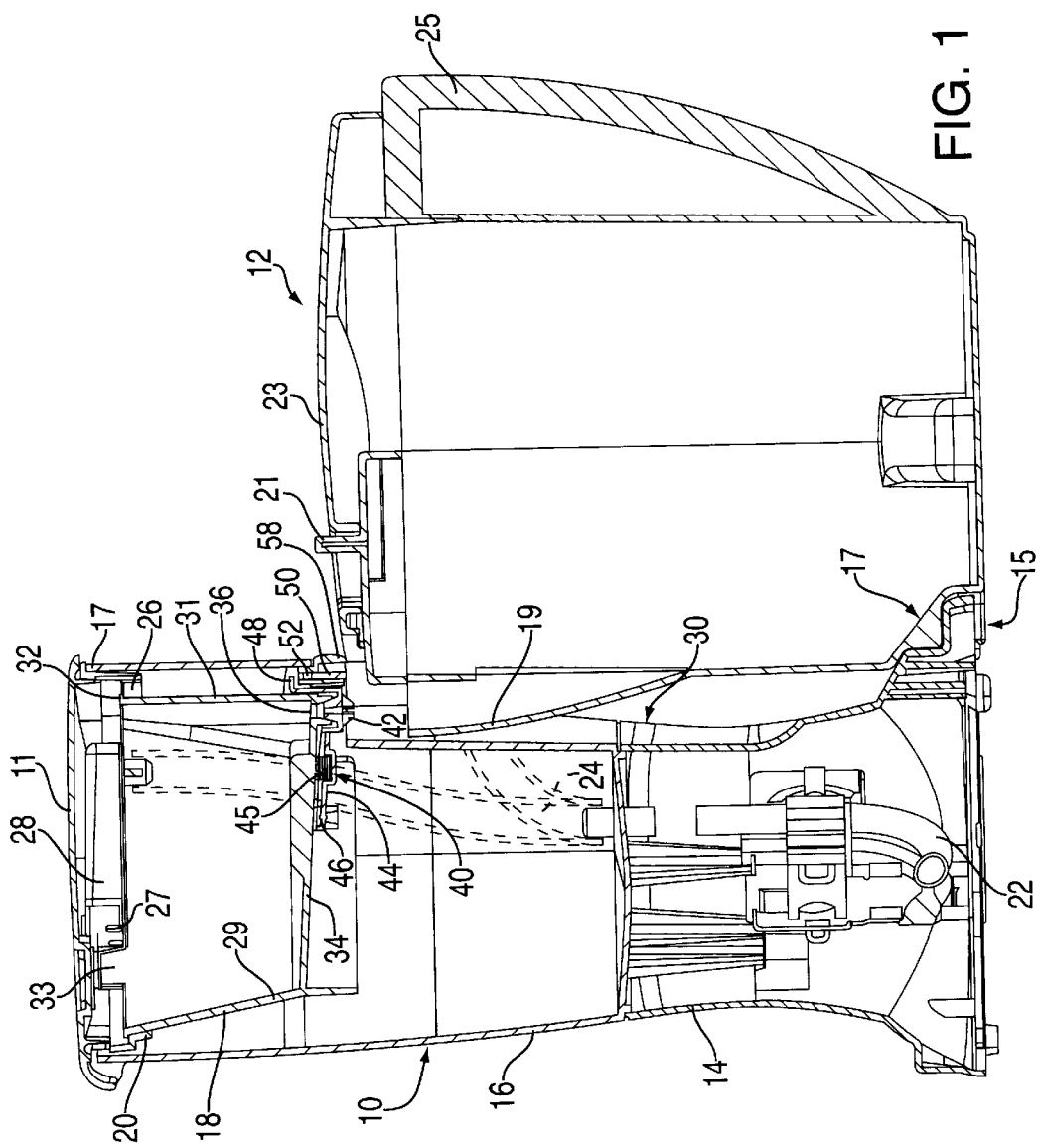
FIG. 1 is a cross-sectional view of the brewing appliance of the present invention.

As shown in FIGS. 1–4, the brewing appliance of the invention includes a water reservoir and brewing basket tower indicated generally at 10, and a pitcher 12 which is positionable adjacent to the tower 10. The tower 10 has a base 14 which supports a water reservoir 16. A brewing basket 18 is positioned within an upper region of the water reservoir, and is supported by a mounting ring 20 attached to a top of the water reservoir wall 17. The tower 10 also has a lid 11 which may be hingedly attached to a side wall of the tower.

Water drains from the water reservoir into a heated conduit 22 mounted in the base 14, and connected to a heated water conduit 24 which extends and attaches to a fitting 26 which is connected to a shower nozzle 28, which extends out over the brewing basket 18. A one-way check valve (not shown) in the conduit between the water reservoir 16 and the heated conduit prevents heated water from entering the water reservoir 16. The shower nozzle 28 is swivel mounted at fitting 26 within a generally horizontal flange section 21 of the mounting ring 20. The shower nozzle 28 can thus be swiveled away from the brewing basket 18 to allow the brewing basket to be removed from the tower.

Figure 10:
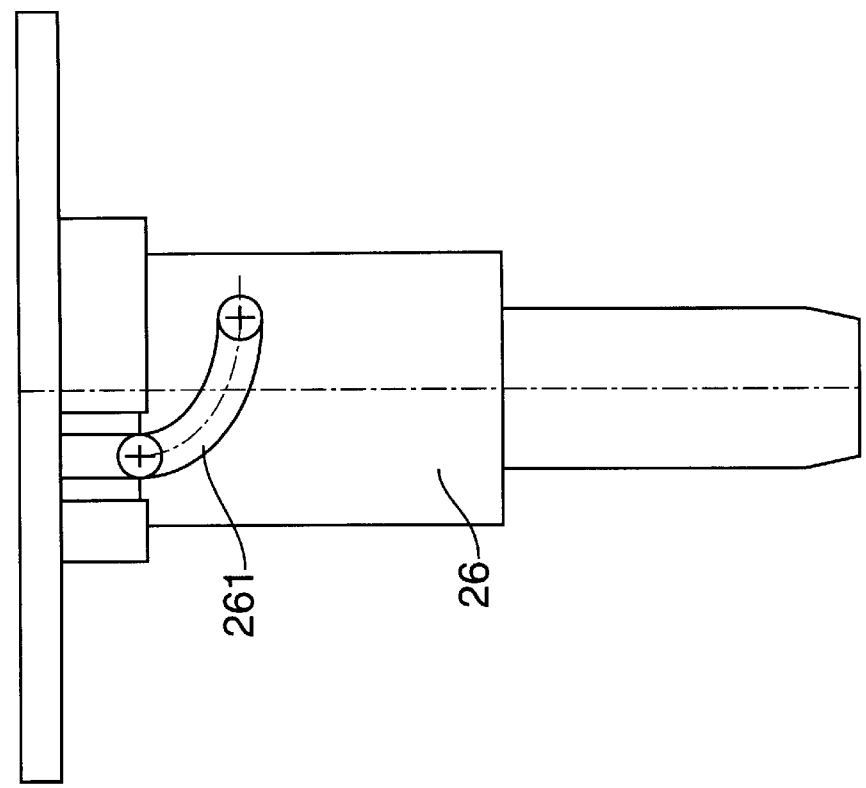
FIG. 10 is an elevation view of a fitting for the shower nozzle of the brewing appliance of the present invention.
Figure 9:
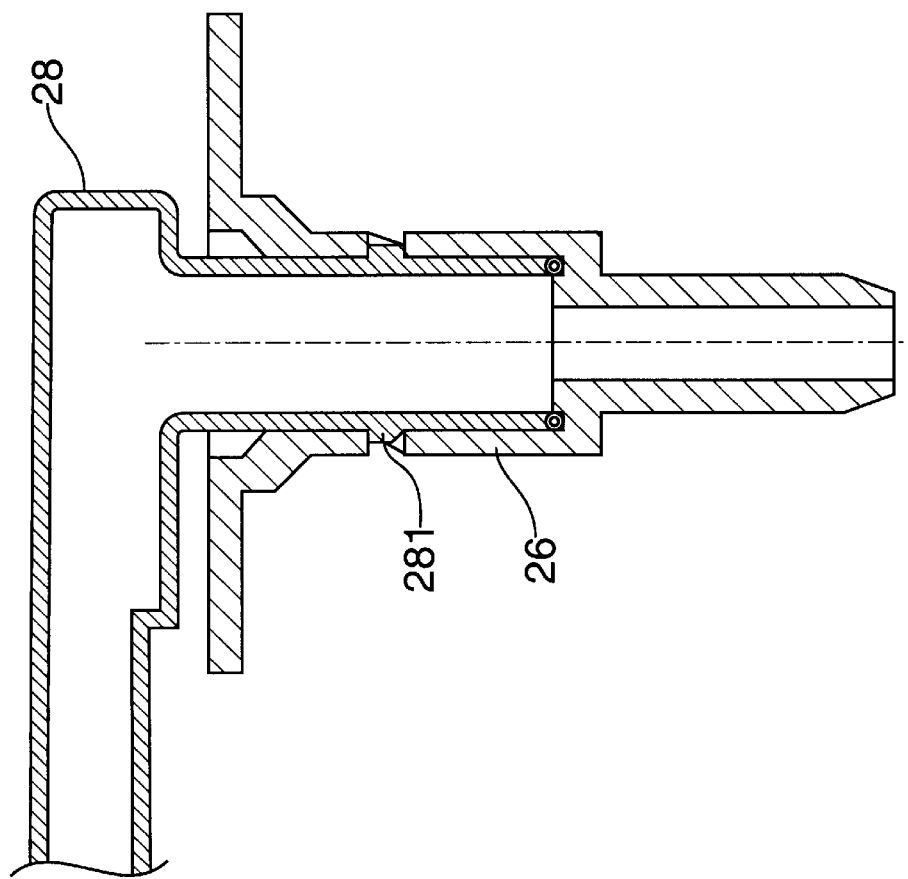
FIG. 9 is a cross-sectional view of the mounting of the shower nozzle with a fitting in the brewing appliance of the present invention.

As shown in FIGS. 9 and 10, fitting 26, which is preferably formed integrally with or attached to mounting ring 20, has opposed helical tracks 261 which receive pins 281 which extend from the distending end 282 of the shower nozzle 28. The pins 281 are deflectable so that once they engage with the helical tracks 261 the shower nozzle 28 is permanently engaged with fitting 26. As the shower nozzle 28 is rotated within the tracks 261 to the side of the mounting ring 20, the shower nozzle 28 is raised to the extent of the helix, thereby preventing the lid 11 from being put in a closed position, unless the shower nozzle 28 is properly positioned over the brewing basket.

Figure 1B:
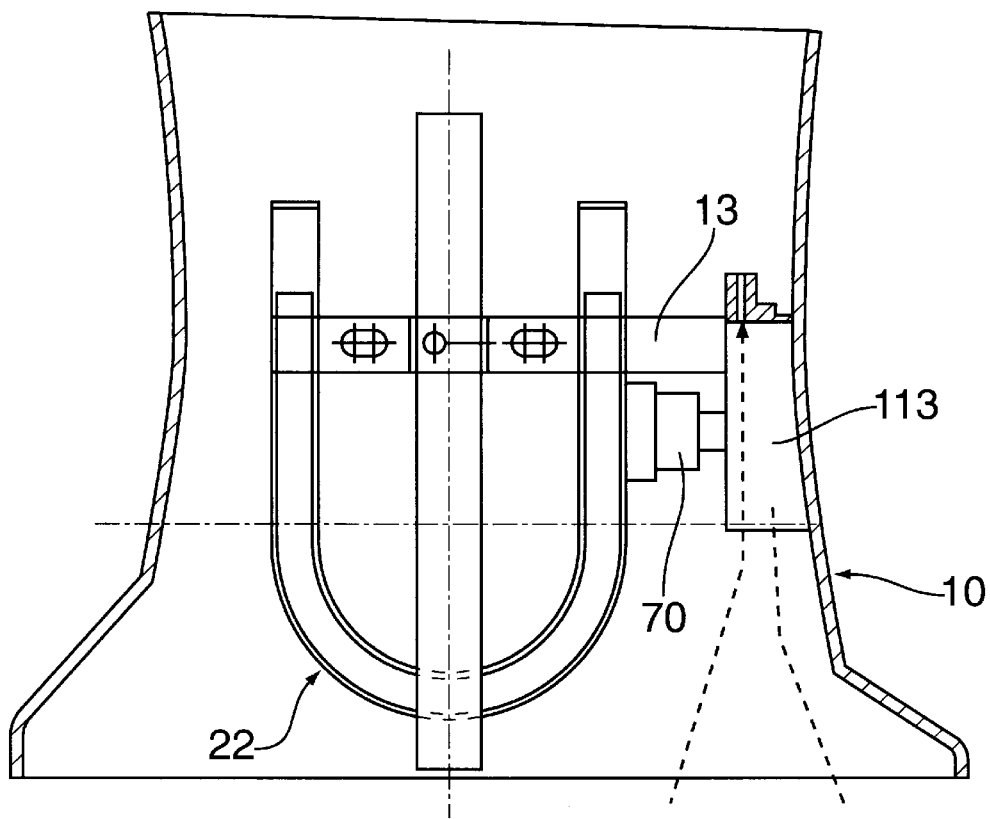
FIG. 1B is a partial cross-sectional view of the base of the brewing appliance of the present invention.
Figure 2:
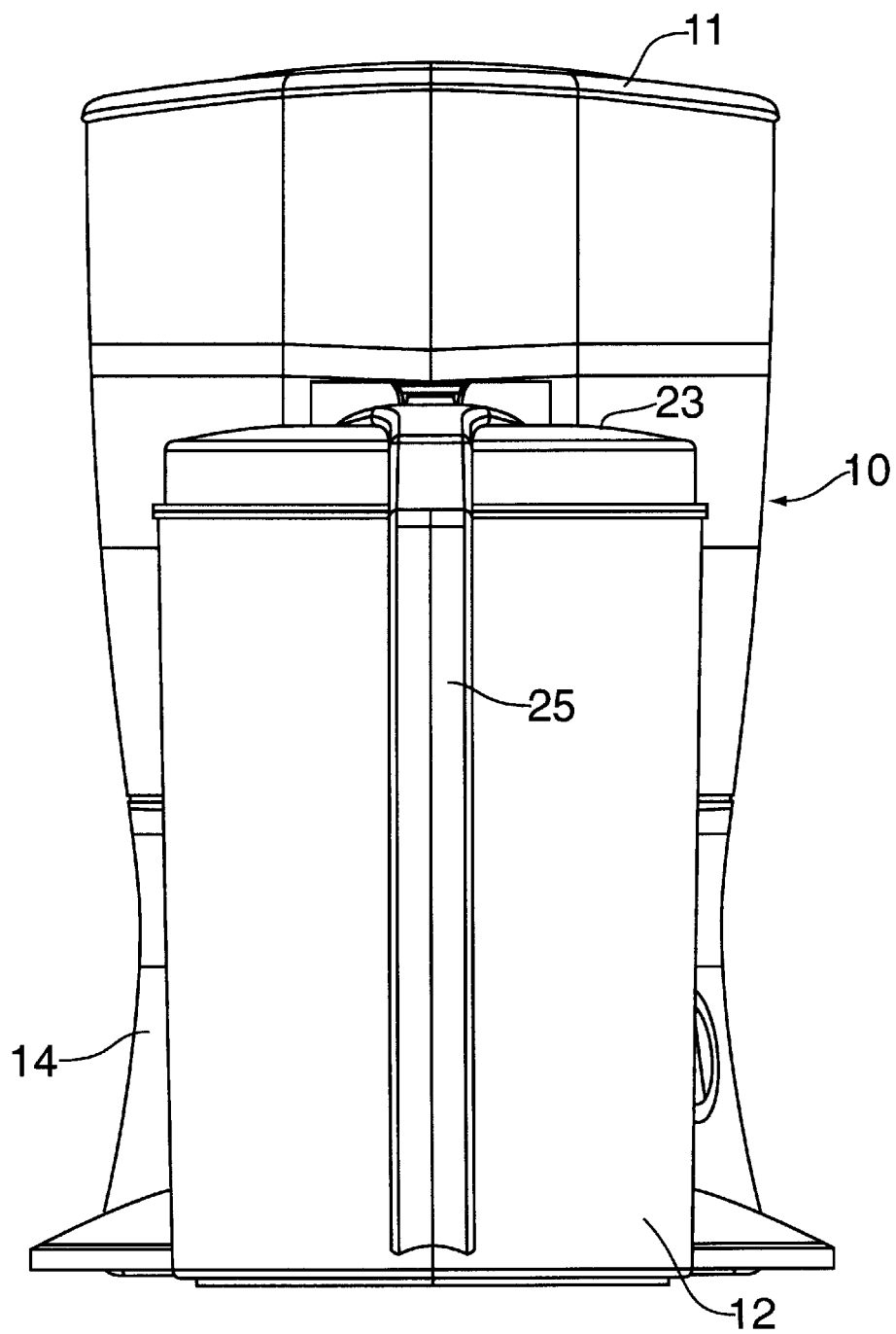
FIG. 2 is an elevation view of the brewing appliance of the present invention.

As shown in FIGS. 1A and 1B, the heated conduit 22 may be mounted in a generally vertical orientation within the base 14 of the tower 10, by attachment to a bracket 13 which is secured to a mounting block 113 on the interior side of the base 14. A thermostat 70 is also mounted on the bracket 13 in contact with or close proximity to the heated conduit 22. In the mounting block 113 is a spring biased actuator button operative to contact a reset plunger 71 of the thermostat 70, which operates to initiate a power supply to the heated conduit 22.

Figure 5:
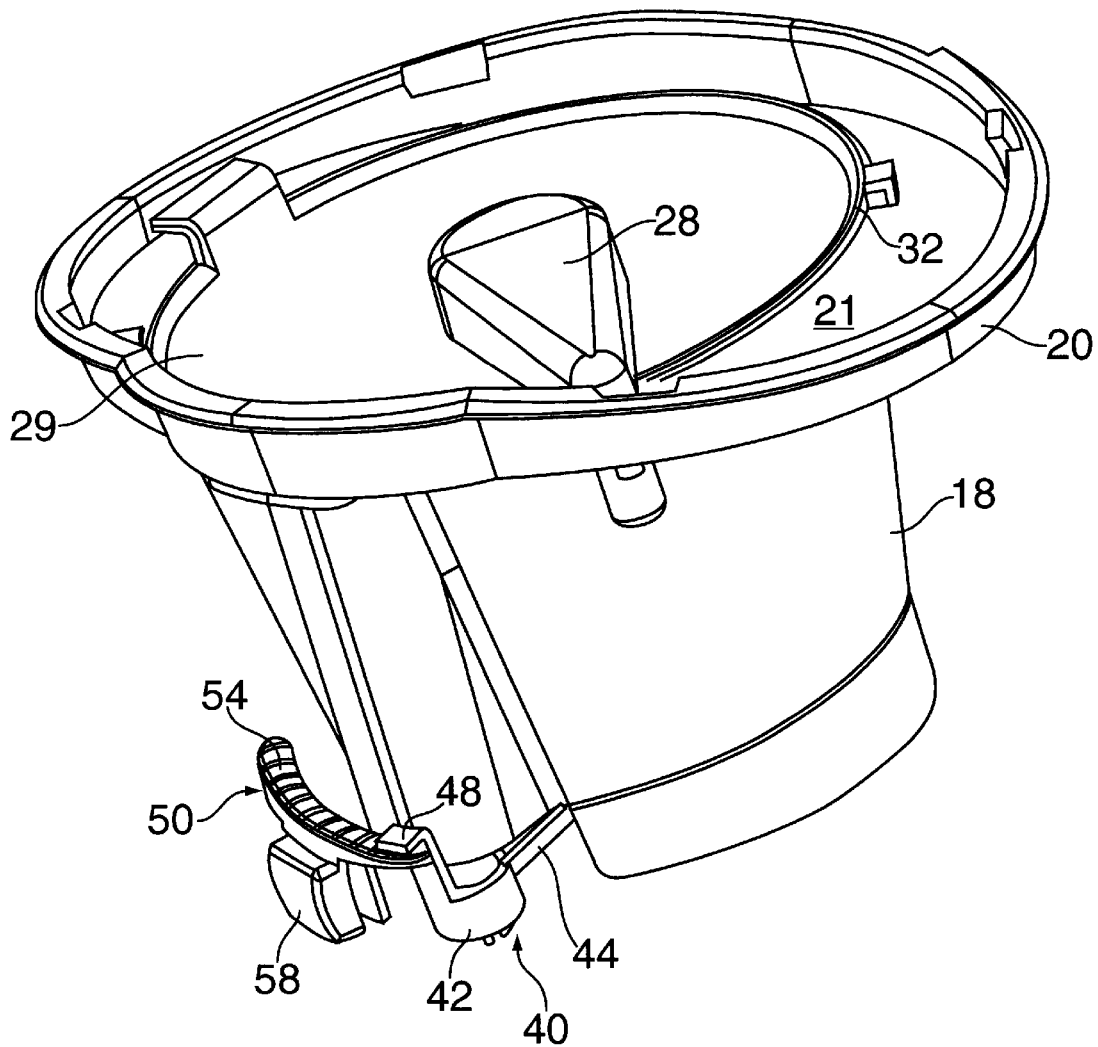
FIG. 5 is a perspective view of the brew basket of the present invention.
Figure 8:
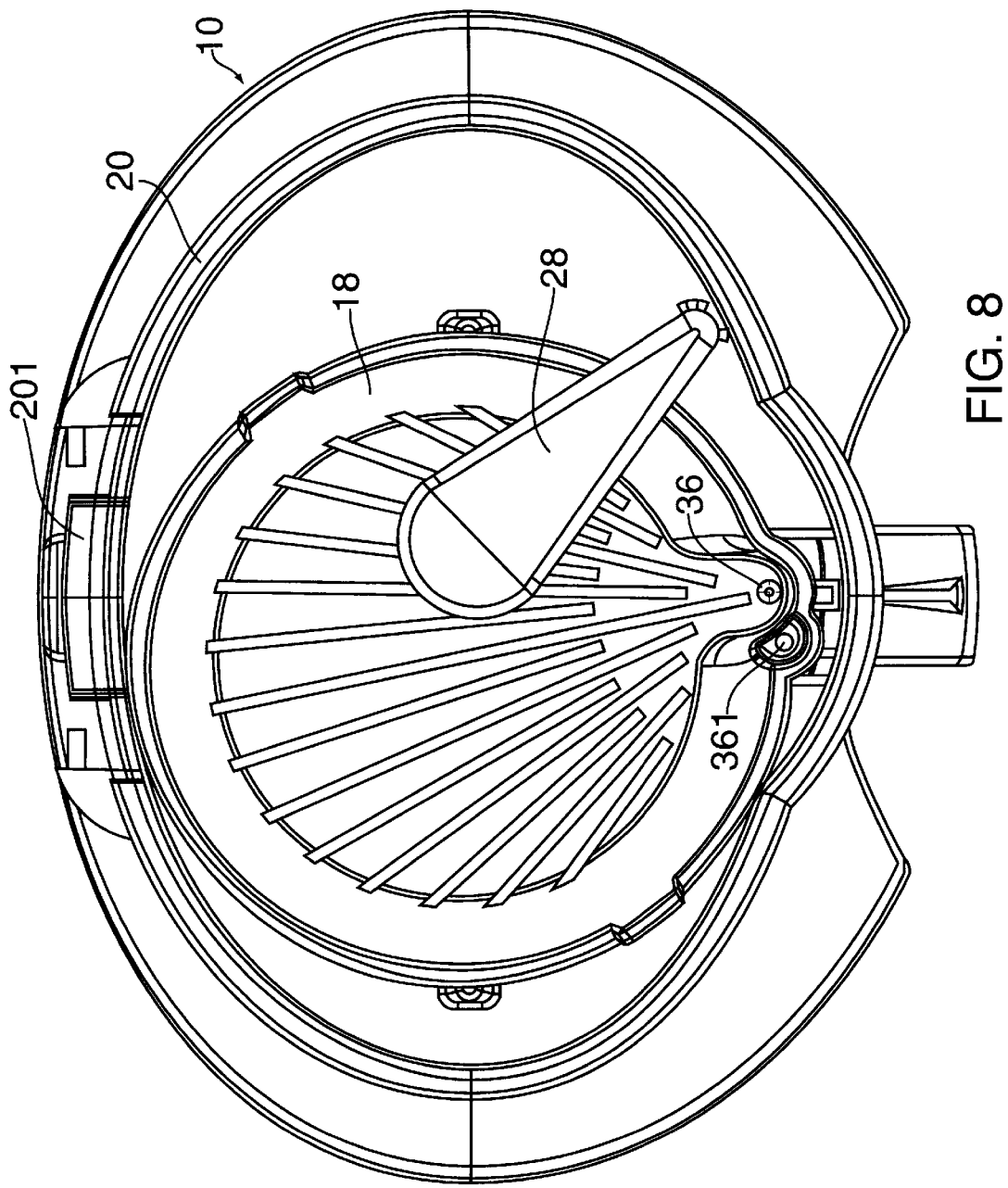
FIG. 8 is a top view of the tower portion of the brewing appliance of the present invention, shown without the lid.

As shown in FIGS. 1, 5 and 8, the shower nozzle 28 is preferably a generally closed conduit which expand at the distal end and have an array of generally radially spaced spray orifices 27 at the frontal wall or edge of the shower nozzle. The spray orifices 27 are generally elongate vertical openings extending from a bottom of the shower head conduit, each having a generally arched top. This design has been found to provide improved water distribution over the entire brewing basket 18 and, of course, the brewing material therein. This is a critical aspect of the brewing performance of the appliance, as increased or maximized distribution of heated water over the brewing material maximizes extraction of flavor, and reduces or eliminates any pooling of water within the brewing basket which can result in overflow from the basket.

The tower 10 has a recess 30 on one side configured to receive a portion of the pitcher 12 as it is positioned adjacent the tower. The base 14 includes a docking station 15 (also shown in FIG. 4) which engages with a correspondingly formed recess and notch 17 in a lower region of the pitcher 12. The notch 17 of the pitcher 12 is aligned with a spout 19 on the pitcher. A slide mounted spout cover 21 is incorporated into the pitcher lid 23. A portion of the pitcher lid 23 extends over the pitcher handle 25.

The brewing basket 18 has a generally tapered side wall 29, a generally vertical side wall 31, and an annular flange 32 at the top of the side walls which overlaps the mounting ring 20. A handle 33 extends from the flange to provide a grip for removing the brewing basket from the tower so that the water reservoir 16 can be filled. The brewing basket 18 fits within the mounting ring 20 in an indexed manner so that the bottom floor 34 of the basket is sloped toward the recessed side 30 of the tower in which the pitcher 12 fits. A brewing basket drain hole 36 is preferably located at the lowermost point of the sloped brewing basket floor 34, but may alternatively be located anywhere in the floor 34. Also, any location of the drain hole where drainage therethrough leads to the exterior of the tower, i.e., to the recess 30 or any other point of exit, is within the scope of the invention. The drain hole 36 is thus positioned above the recess 30 in the tower, and over the top opening to the spout 19 of the pitcher 12 when the pitcher is engaged in the docking station 15 within tower recess 30. By this arrangement, as water is introduced into the brewing basket 18, and passes through a brewing material and filter in the brewing basket, a brewed beverage drains from the brewing basket 18 through drain hole 36 into the spout 19 of pitcher 12.

The rate of flow of liquid through the brewing basket is controlled by a valve assembly 40 integral with the brewing basket 18. The valve assembly 40 includes a frusto-conical valve element 42 positioned within the drain hole 36 by a valve arm 44. The valve arm 44 is generally vertically pivotally mounted at end 46, and biased away from the basket floor 34 by a spring 45. The valve arm 44 extends past the valve element 42 and turns upward outside of the outer wall of the brewing basket, terminating in a cam follower 48. A sliding cam flow rate controller 50 is mounted within a channel 52 in the side wall of the tower 10.

As best shown in FIG. 5, the controller 50 has an angled cam surface 54 on which the cam follower 48 rides. As the controller is laterally translated within the channel 52, the cam follower 48 is moved up or down upon the angled cam surface 54, pivoting the valve arm 44 about end 46, and thereby moving the position of the valve element 42 relative to the drain hole 36. For example, with the controller laterally slid to position the uppermost point of the cam surface 54 under the cam follower 48, the valve element 42 is at a maximum advanced position in the drain hole 36, thus restricting the liquid flow rate from the brewing basket 18.

The valve element 42 may also include an axial bore so that even with the valve element in the most advanced position within the drain hole 36, a minimum flow rate through the valve element is assured. With the controller 50 laterally slid to position the cam follower 48 at the lowest point of the cam surface 54, the valve element 42 is substantially retracted from the drain hole 36, thus maximizing the flow rate from the brewing basket. The controller is provided with a slide handle 58 which is accessible from the exterior of the tower 10.

In the event that drain hole 36 becomes completely occluded, the brewing basket 18 is provided with an alternate drain hole 361, as shown in FIG. 8, at an elevation slightly above drain hole 36.

Figure 3:
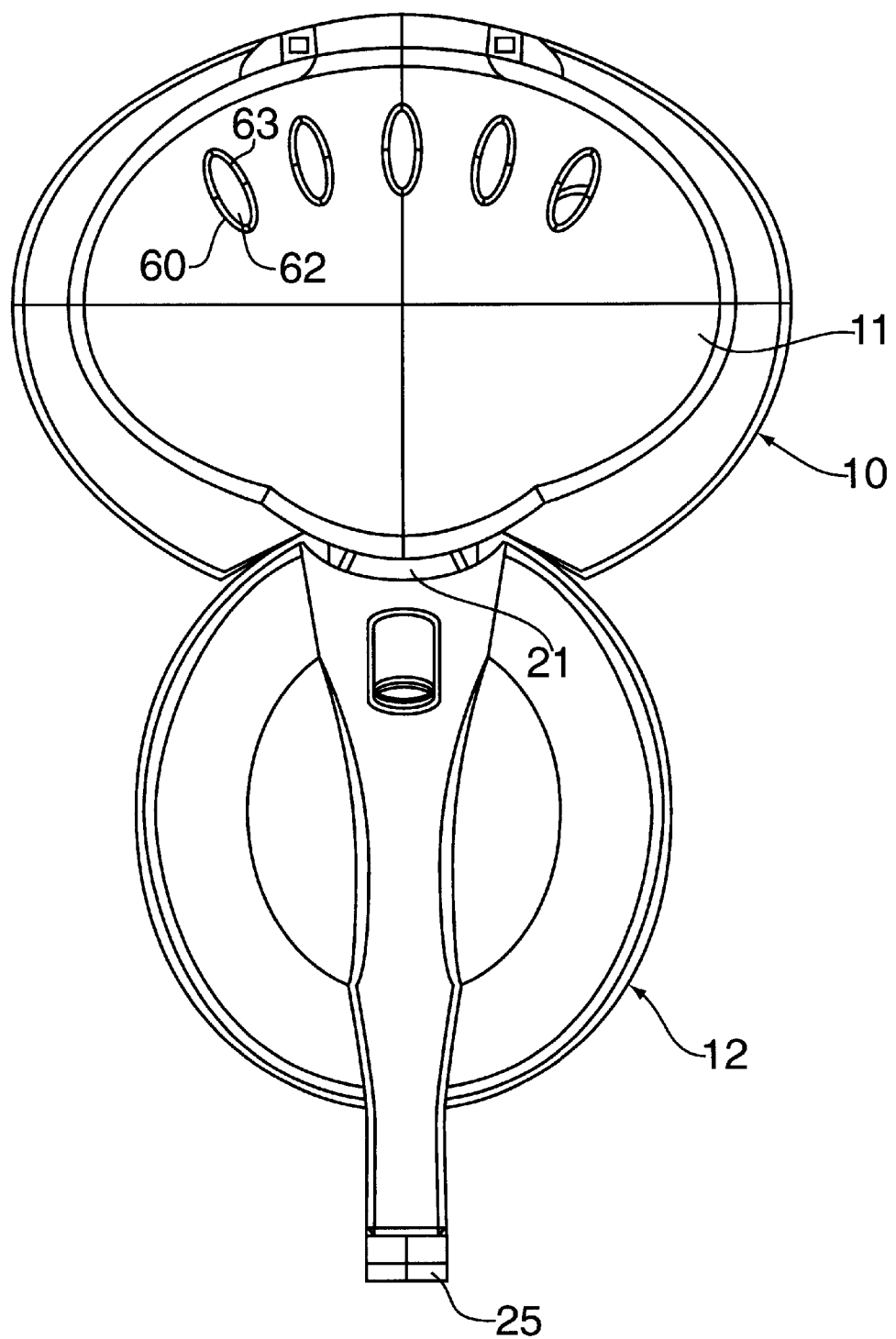
FIG. 3 is a top view of the brewing appliance of the present invention.
Figure 4:
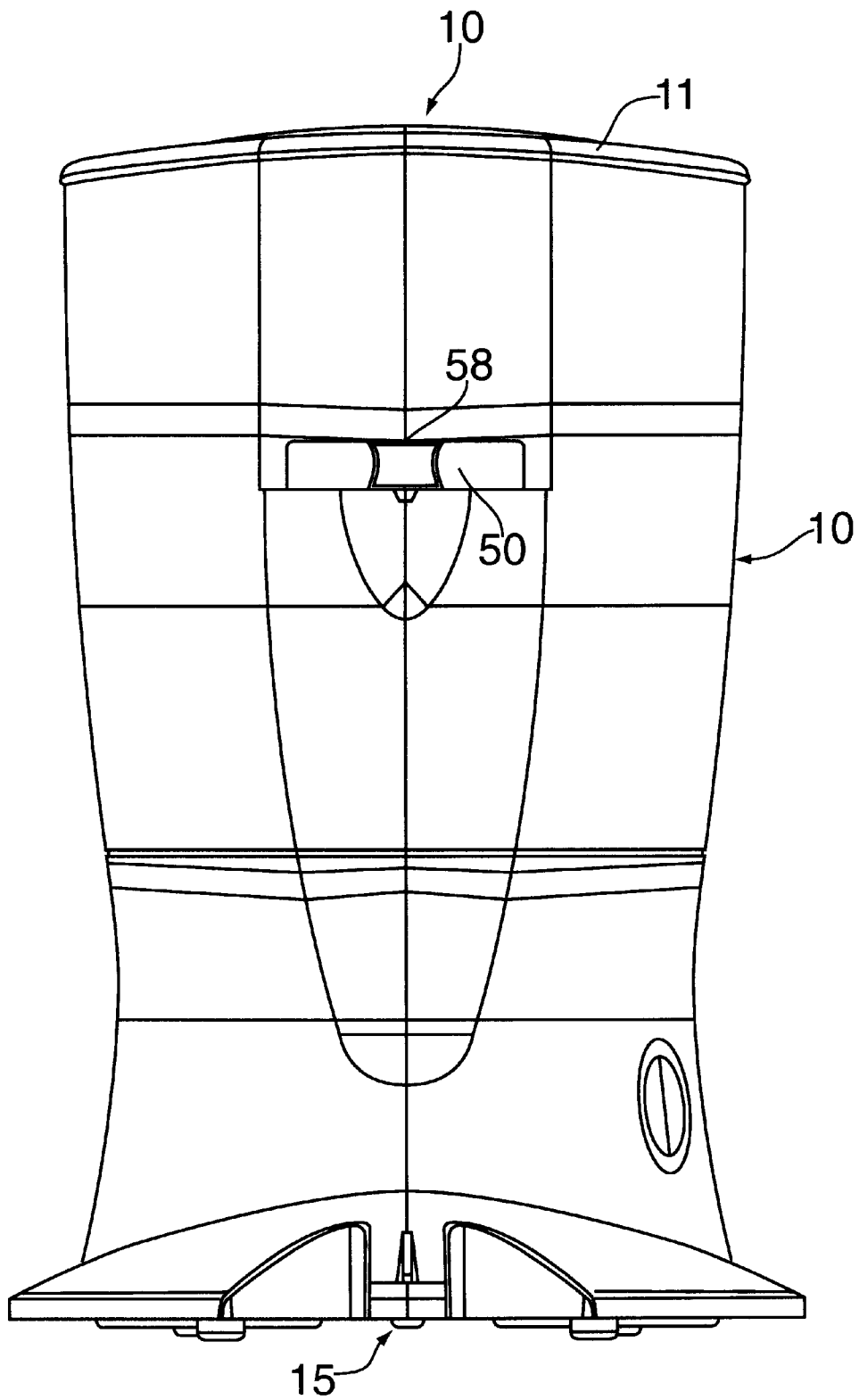
FIG. 4 is a elevation view of the water reservoir and brewing basket tower of the present invention.
Figure 6:
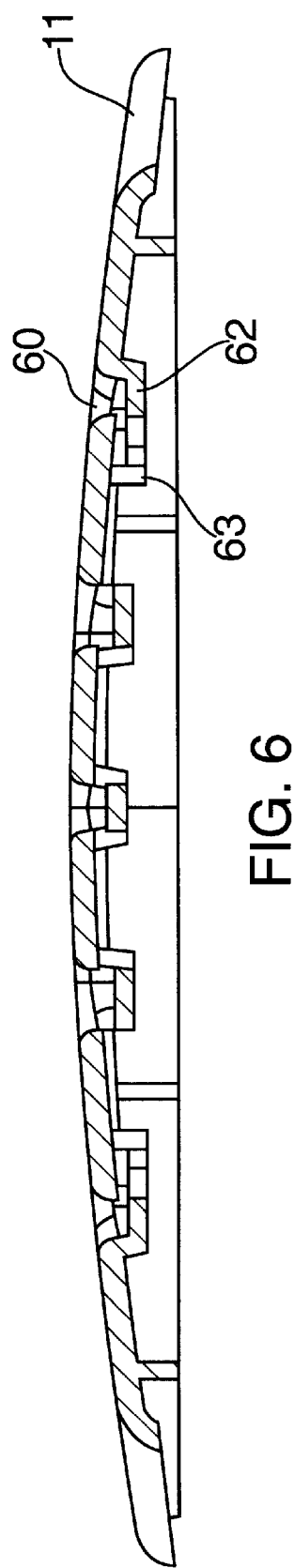
FIG. 6 is a cross-sectional view of the vent structure in the cover of the water reservoir and brewing basket tower of the present invention.

As shown in FIGS. 3 and 6, the lid 11 of the tower 10 is provided with openings 60 which allow steam, generated from the hot water introduced to the brewing chamber, to escape and thereby reduce condensation and heat level on the interior of the lid. As shown in FIG. 6, the openings 60 are novelly configured with a deflector 62 which is countersunk or offset from the opening 60 but generally aligned with the opening, creating gaps 63 between the deflector 62 and the opening 60 through which steam escapes.

Figure 7:
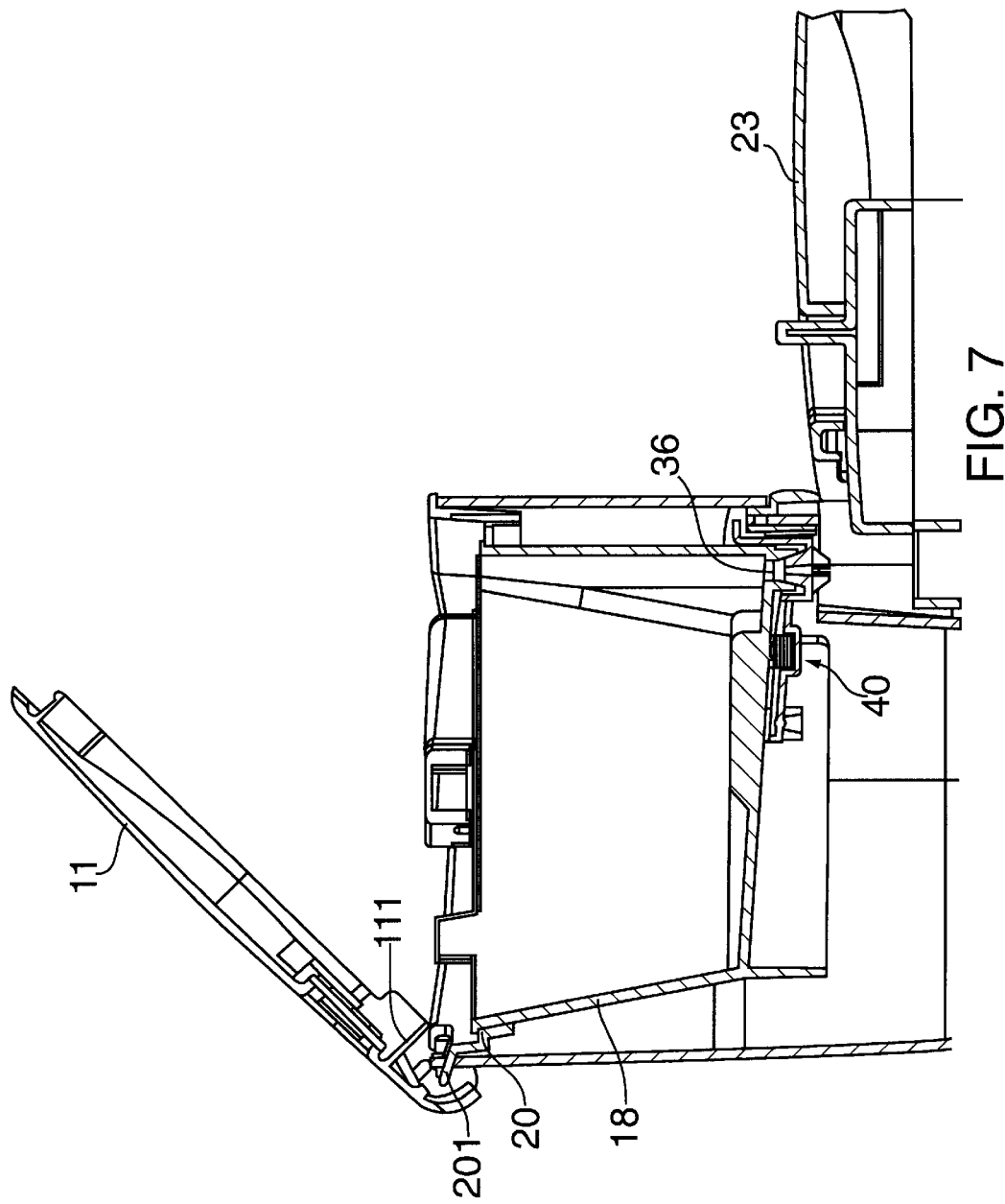
FIG. 7 is a cross-sectional view of an upper region of the brewing appliance of the present invention.

As shown in FIG. 7, the lid 11 includes a flange 111 which directs any condensate which does collect on the interior of the lid into the brewing basket 18. Ribs on the interior of the lid 18 direct the condensate to flow toward flange 111 when the lid 11 is in the opened position shown. As shown in FIGS. 7 and 8, the mounting ring 20 includes a drip ledge 201 which extends out beyond the wall of the tower 10 to catch any condensate from the lid and direct it toward the brewing basket.

To prepare a hot brewed beverage such as tea or coffee with the appliance, the tower lid 11 is opened and the shower nozzle 28 swung to the side of the mounting ring 20. The brewing basket 18 removed, and the water reservoir 10 filled with a sufficient amount of water. The maximum water level within the reservoir is near the bottom of the brewing basket. The brewing basket 18 is loaded with a filter such as a paper filter and a brewing material such as coffee grounds or tea leaves or other flavoring agent, and positioned within the tower as described. The shower nozzle 28 is repositioned over the brewing basket. The lid 11 is closed. The flow rate (or brew strength) is selected by operation of slide 58 of the valve assembly 40. The pitcher 12 is positioned adjacent to the tower and engaged in the docking station 15 as described. A power control circuit (not shown) connected to the heated conduit 22 is activated to provide thermal energy to the heated conduit to begin heating water from the water reservoir and transferring heated water to the brewing basket 18. A brewed beverage then drains from the brewing basket into the pitcher as described.

What is claimed is:

1. A beverage preparation device comprising a housing having:
   a water reservoir for holding a quantity of water for producing a beverage,
   a brewing basket for holding a brewing material, the brewing basket having a wall and a sloped floor and a drain hole in the sloped floor near the wall, the drain hole being positioned to allow passage of liquid to the exterior of the beverage preparation device,
   means for heating water connected to the water reservoir and connected to a shower nozzle positioned to distribute heated water into the brewing basket,
   a drain hole valve assembly connected to the brewing basket, the drain hole valve assembly having a pivotally mounted valve arm, and a valve element connected to the valve arm, whereby a change in position of the valve arm changes a position of the valve element relative to the drain hole to vary a rate of flow between a minimum and a maximum flow rate of a liquid through the drain hole.

2. The beverage preparation device of claim 1 wherein the valve element is generally conical in shape.

3. A beverage preparation device for preparing a beverage by putting heated water in contact with a brewing material, and the device comprising:
   a tower which supports a water reservoir, and a brewing basket substantially over the water reservoir, the tower enclosing a water heating and pumping device operative to receive and heat water from the reservoir and direct heated water to the brewing basket;
   the brewing basket having a drain hole positionable within a recess in an exterior wall of the tower, the recess adapted to receive an opening to a pitcher or receptacle;
   a valve assembly connected to the brewing basket, the valve assembly having a valve arm and a valve element substantially aligned with the drain hole and movable relative to the drain hole to vary a rate of flow of liquid between a minimum and a maximum flow rate through the drain hole.

4. A beverage preparation device comprising a housing having:
   a water reservoir for holding a quantity of water for producing a beverage,
   a brewing basket for holding a brewing material, the brewing basket having a wall and a sloped floor and a drain hole in the sloped floor near the wall, the drain hole being positioned to allow passage of liquid to the exterior of the beverage preparation device,
   means for heating water connected to the water reservoir and connected to a shower nozzle positioned to distribute heated water into the brewing basket,
   a drain hole valve assembly connected to the brewing basket, the drain hole valve assembly having a pivotally mounted valve arm, and a valve element connected to the valve arm, whereby a change in position of the valve arm changes a position of the valve element relative to the drain hole to affect a rate of flow of a liquid through the drain hole wherein the valve arm is pivotally connected at one end to the brewing basket and has a cam follower at a substantially opposite end in contact with a cam located on a tower which supports the reservoir and brewing basket.

5. A beverage preparation device comprising a housing having:
   a water reservoir for holding a quantity of water for producing a beverage,
   a brewing basket for holding a brewing material, the brewing basket having a wall and a sloped floor and a drain hole in the sloped floor near the wall, the drain hole being positioned to allow passage of liquid to the exterior of the beverage preparation device,
   means for heating water connected to the water reservoir and connected to a shower nozzle positioned to distribute heated water into the brewing basket,
   a drain hole valve assembly connected to the brewing basket, the drain hole valve assembly having a pivotally mounted valve arm, and a valve element connected to the valve arm, whereby a change in position of the valve arm changes a position of the valve element relative to the drain hole to affect a rate of flow of a liquid through the drain hole wherein the valve arm is pivotally connected at one end to the brewing basket and has a cam follower at a substantially opposite end in contact with a cam located on a tower which supports the reservoir and brewing basket, and the valve element is located between the ends of the valve arm.

6. A beverage preparation device comprising a housing having:
   a water reservoir for holding a quantity of water for producing a beverage,
   a brewing basket for holding a brewing material, the brewing basket having a wall and a sloped floor and a drain hole in the sloped floor near the wall, the drain hole being positioned to allow passage of liquid to the exterior of the beverage preparation device,
   means for heating water connected to the water reservoir and connected to a shower nozzle positioned to distribute heated water into the brewing basket,
   a drain hole valve assembly connected to the brewing basket, the drain hole valve assembly having a pivotally mounted valve arm, and a valve element connected to the valve arm, whereby a change in position of the valve arm changes a position of the valve element relative to the drain hole to affect a rate of flow of a liquid through the drain hole wherein the valve arm is pivotally connected at one end to the brewing basket and has a cam follower at a substantially opposite end in contact with a cam located on a tower which supports the reservoir and brewing basket, and the cam is slidably mounted in the tower whereby a position of the cam relative to the valve arm can be changed.

7. A beverage brewing appliance for preparing a brewed beverage with heated water and a brewing material, the beverage brewing appliance comprising:
   a tower including a water reservoir, a brewing basket, and a heated conduit connected to the water reservoir and connected to the brewing basket,
   the brewing basket having a sloped floor and a drain hole at an edge of the sloped floor, and
   a pitcher positionable adjacent to the tower so that a brewed beverage drains from the brewing basket through the drain hole into the pitcher, wherein the brewing basket is supported within the tower by a mounting ring, and a fluid passageway connects the heated conduit to a shower nozzle mounted in the mounting ring, the shower nozzle being positionable over the brewing basket to distribute heated water into the brewing basket.

8. The beverage brewing appliance of claim 7 wherein the brewing basket has a drain hole valve assembly having a pivotally mounted valve arm which movably supports a valve element relative to the brewing basket drain hole.

9. The beverage brewing appliance of claim 7 wherein the brewing basket has a drain hole valve assembly having a pivotally mounted valve arm which movably supports a valve element relative to the brewing basket drain hole.

10. The beverage brewing appliance of claim 8 wherein the drain hole valve assembly is connected to a sliding cam mechanism accessible from the exterior of the tower.

11. The beverage brewing appliance of claim 7 wherein the brewing basket is positioned Within the tower at a height greater than a height of a spout of the pitcher.

12. The beverage brewing appliance of claim 7 wherein the tower further comprises a lid which covers the brewing basket.

13. The beverage brewing appliance of claim 7 wherein the pitcher comprises a lid, the lid having a movable segment configured to cover an opening to a spout of the pitcher in one position, and to open a passageway through the spout of the pitcher in another position.

* * * * *